United States Patent [19]
Powell

[11] Patent Number: 5,327,674
[45] Date of Patent: Jul. 12, 1994

[54] TRAP FOR HARVESTING EARTHWORMS

[76] Inventor: Timothy R. Powell, R.R. 2, Box 195 A, Williamsport, Ind. 47993

[21] Appl. No.: 44,653

[22] Filed: Apr. 8, 1993

[51] Int. Cl.⁵ .............................................. A01M 23/10
[52] U.S. Cl. .............................................. 43/71; 43/4; 43/69; 43/74
[58] Field of Search .................... 43/71, 64, 65, 66, 69, 43/74

[56] References Cited

U.S. PATENT DOCUMENTS

| | | | |
|---|---|---|---|
| 1,050,220 | 1/1913 | Link | 43/71 |
| 1,101,368 | 6/1914 | Willard | 43/74 |
| 1,308,277 | 7/1919 | Corrigan | 43/72 |
| 3,201,893 | 8/1965 | Gesmar | 43/113 |
| 4,372,074 | 2/1983 | Arrabit | 43/74 |
| 4,914,854 | 4/1990 | Zhou et al. | 43/112 |

Primary Examiner—P. Austin Bradley
Assistant Examiner—Chuck Y. Mah
Attorney, Agent, or Firm—H. John Barnett

[57] ABSTRACT

A trap for earthworms which comprises a capture chamber having a bottom, inwardly sloping sidewalls and pivotal louvers defining a horizontal top of the capture chamber. Earthworms leave their burrows at night, or when the burrows are soaked with water, and crawl onto the pivotal louvers which rotate, causing the earthworms to fall into the capture chamber. A canopy may be provided over the trap to shelter it from rain or water sprinklers.

3 Claims, 3 Drawing Sheets

TRAP FOR HARVESTING EARTHWORMS

BACKGROUND OF THE INVENTION

1. Field of the Invention

This invention is directed to a trap for earthworms, especially night crawlers, which are a very effective fishing bait for many species of fresh water fish. The trap is environmentally safe and does not damage the earthworms.

Earthworms, leave their burrows when flooded during rain to avoid drowning. They will move to relatively drier places so that they can continue to respire through their skins. Earthworms also move out of their burrows at night to find and mate with other earthworms.

2. Description of the Prior Art

The following patents disclose methods for harvesting earthworms:

| Patent Number | Inventor | Date |
| --- | --- | --- |
| 4,178,711 | Mermal, et al | 1979 |
| 4,570,372 | Lukas | 1989 |
| 4,817,331 | Podsiadly, et al | 1989 |
| 4,934,087 | Zanon, et al | 1990 |

All of the above patents are directed to either chemical or electrical means to cause earthworms to leave their burrows, and none of them takes advantage of the earthworm's natural reaction to flooding of their burrows.

Mermal et al employ husks of black walnuts with water. A considerable amount of black walnut husks are soaked in water to form a dark liquid. Lukas makes a solution containing 12 to 30 ppm chlorine in water. Podsiadly et al disclose an electrical system for causing earthworms to leave their burrows. Zanon et al employ a solution of mustard, cayenne pepper and popcorn salt to cause earthworms to come to the surface for harvesting.

All of the above patents require some expertise, either in proper mixing of chemical ingredients to avoid killing the earthworms, or in handling the electric power supply to avoid injury to the worms or operators. In any event, each of the above methods or apparatus requires ongoing supplies of chemicals or batteries, and may cause indiscriminate injury to surrounding plants and animals, if not used carefully.

SUMMARY OF THE INVENTION

This invention is directed to a relatively simple, mechanical trap for safely harvesting earthworms which takes advantage of their natural propensity to move to a relatively drier environment when their burrows are flooded, either by rain or by soaking the harvest area with a sprinkler. The earthworm trap comprises a closed chamber having a bottom, inwardly sloping sidewalls and a horizontal, louvered top. A rain canopy may be provided over the trap to shelter it from rain. The sidewalls are preferably sloped at an angle of less than about 45 degrees, 25 degrees being considered desirable.

The louvered top comprises a plurality of pivoted louvers which are normally horizontal, but which rotate in response to the weight of an earthworm to dump the worm into the chamber. The louvers then return to their horizontal, at rest position to be ready to receive another earthworm.

The trap may be placed on the ground in an area having a high concentration of earthworms. Flooding of the earthworm burrows, either by natural rain or by soaking the ground with a sprinkler, or the like, will cause the earthworms to climb the sloping walls of the trap onto the louvered top. As the earthworms move their weight onto the louvered top, the louvers rotate to drop the worms into the chamber. A plurality of traps may be used to increase the harvest, without any adverse impact on the environment, provided that some earthworms are allowed to remain to propagate.

DESCRIPTION OF THE PREFERRED EMBODIMENTS

Figure 1:
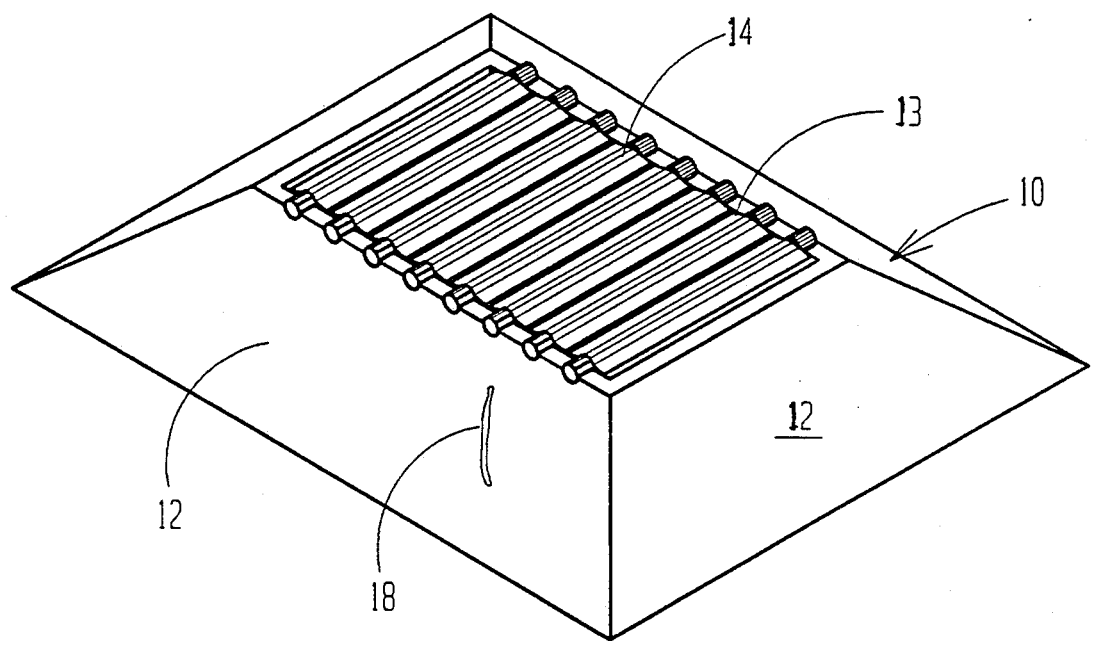
FIG. 1 of the drawings is a schematic perspective view of the trap showing the inwardly sloping sidewalls and the louvered top.

An earthworm trap 10 comprises a base 11, inwardly sloping sidewalls 12 and a louvered top 13. The louvered top 13 comprises a plurality of louvers 14, each having axially disposed end spindles 15 and 16, which normally rest in slots 17 so that louvers 14 are normally horizontal, but which rotate when weight such as an earthworm 18, is applied to the louvers 14 so that the earthworm 18 falls through the louvered top 13 into trap chamber 19. The inward slope of the sidewalls 12 effectively prevent earthworms 18 escaping trap 10.

Figure 2:
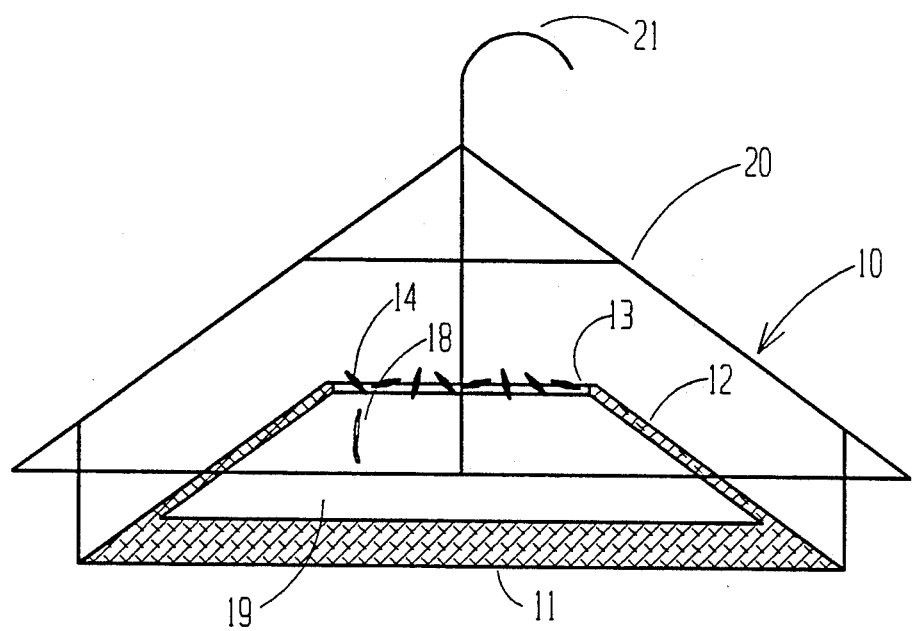
FIG. 2 is a schematic side view of the trap shown in FIG. 1 with some parts broken away showing the trap in use with a protective canopy and carrying handle in place above the trap.

FIG. 2 of the drawings shows a canopy 20 having a handle 21 which may be assembled over the trap 10 to protect the louvered top 13 and sloping sidewalls 12 from rain or sprinklers. The canopy 20 also provides a drier area for earthworms 18, to which they move during soaking of their burrows by natural rain or artificial soaking with water.

Figure 3:
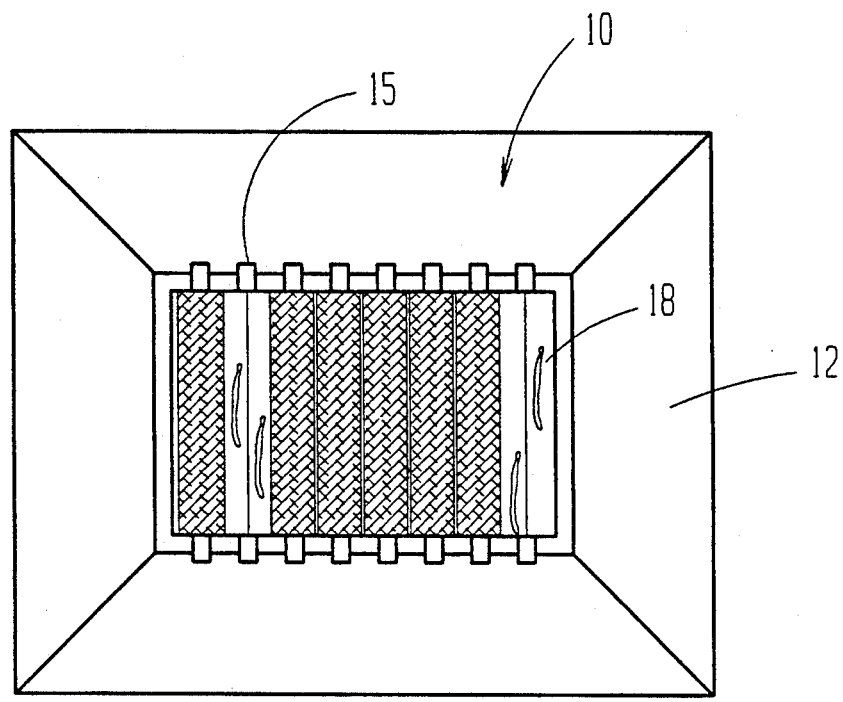
FIG. 3 is a schematic top plan view of the trap showing nine sand coated louvers and several being rotated by earthworms falling into the trap chamber.
Figure 5:
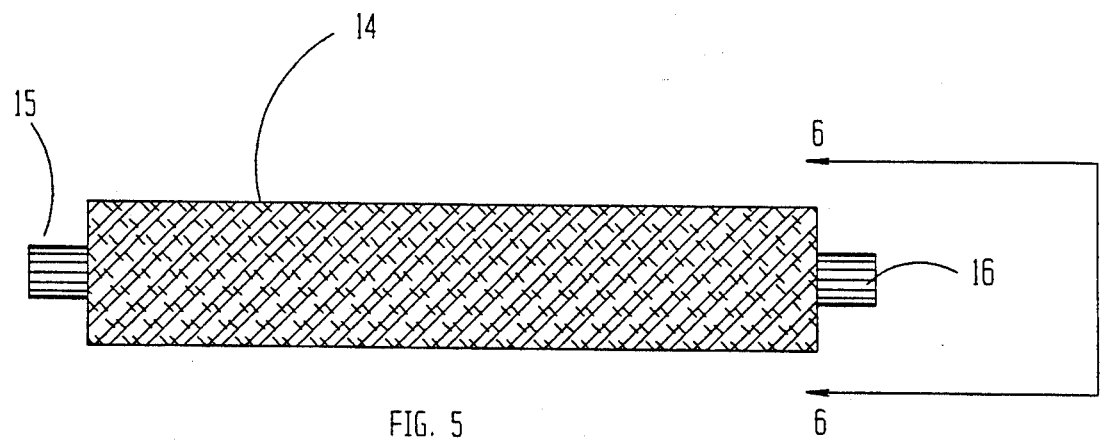
FIG. 5 is an enlarged schematic plan view of a sand coated louver of the type shown in FIG. 3.

As shown in FIGS. 2, 3 and 5, the sloping sidewalls 12 and the louvers 14 may be coated with sand, which is easier for the earthworms 18 to move on. FIGS. 1-3 also show some earthworms 18 climbing sidewalls 12 and other earthworms 18 tilting the louvers 14 to fall by gravity into the trap chamber 19.

Figure 4:
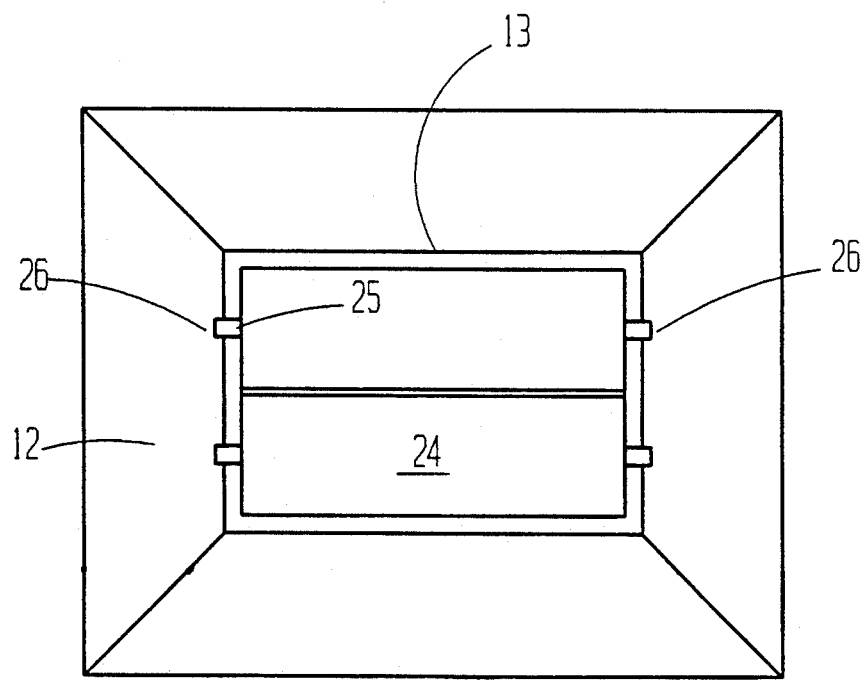
FIG. 4 is a schematic top plan view of another embodiment of the trap having a pair of louvers resting on the top of the trap chamber.

FIG. 4 of the drawings shows another embodiment of the louvered top 13 which has a pair of larger louvers 24, each having a pair of spindles 25, which are supported in slots 26. It is believed that the latter embodiment shown in FIG. 4 will be more effective for trapping very large earthworms (night crawlers).

Figure 6:
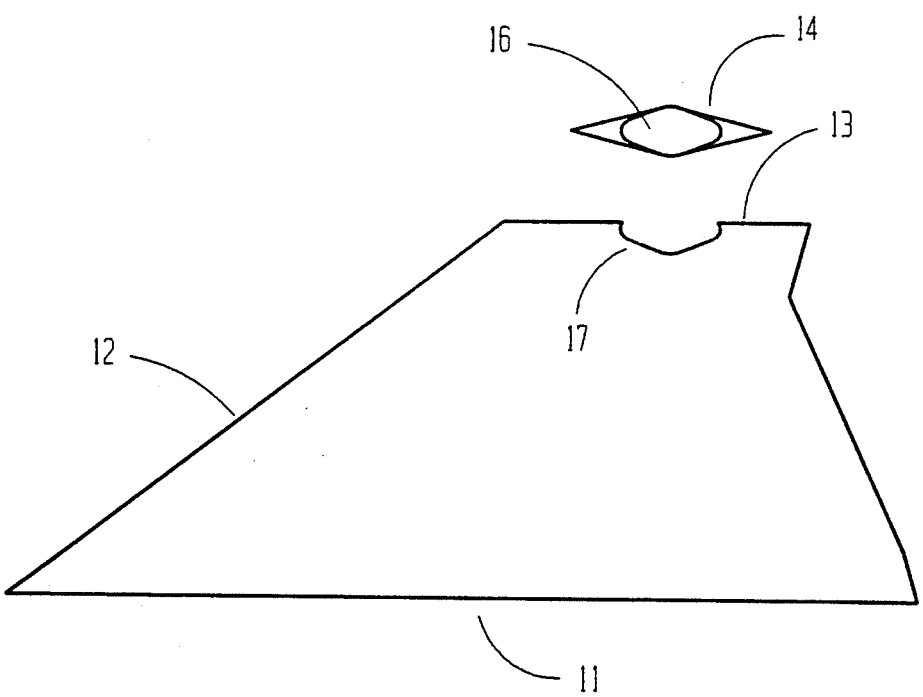
FIG. 6 is an end view taken along line 6—6 of FIG. 5, and a side view of the trap with parts broken away, showing the notch in the top of the sidewall in which the louver end rests.

FIGS. 5 and 6 of the drawings shows the axial spindles 15 and 16 in more detail. In particular, FIG. 6 shows the end of the spindle 16 and a side view of notch 17 in which spindle 16 is supported. This oval configuration of notch 17 and spindles 15 and 16 ensures that each louver 14 will return to a horizontal orientation after being rotated from the weight of an earthworm 18. The spindles 15 are identical to spindles 16. The spindles 25 and notches 26 are also similar to insure that the louvers 24 return to a horizontal position after dropping a night crawler into the trap chamber 19.

What is claimed is:

1. A trap for harvesting earthworms comprising:

a trap chamber defined by a base and four inwardly sloped solid sidewalls having inner, outer and top surfaces;

a plurality of horizontally disposed louvers having flattened surfaces, said louvers being pivotally supported on the top surfaces of the inwardly sloped sidewalls, the outer surfaces of the inwardly sloped sidewalls and the flattened surfaces of the louvers being sand-coated to enable effective movement of earthworms up the sidewalls onto the louvers, the into the trap; and each louver having first and second end spindles disposed on opposite top surfaces of the sidewalls, said end spindless having a flattened oval contour when viewed from the side along the axis of the corresponding louver, whereby the associated louver tends to return to a horizontal plane when at rest after rotating from the weight of an earthworm falling into the trap chamber.

2. The trap of claim 1, including a protective canopy disposed over the trap for keeping the inwardly sloping sidewalls and louvers relatively dry during rain, sprinkling or dew fall.

3. The trap of claim 2, including means for securing the canopy to the trap to enable transportation as a unit.

* * * * *